UNITED STATES PATENT OFFICE.

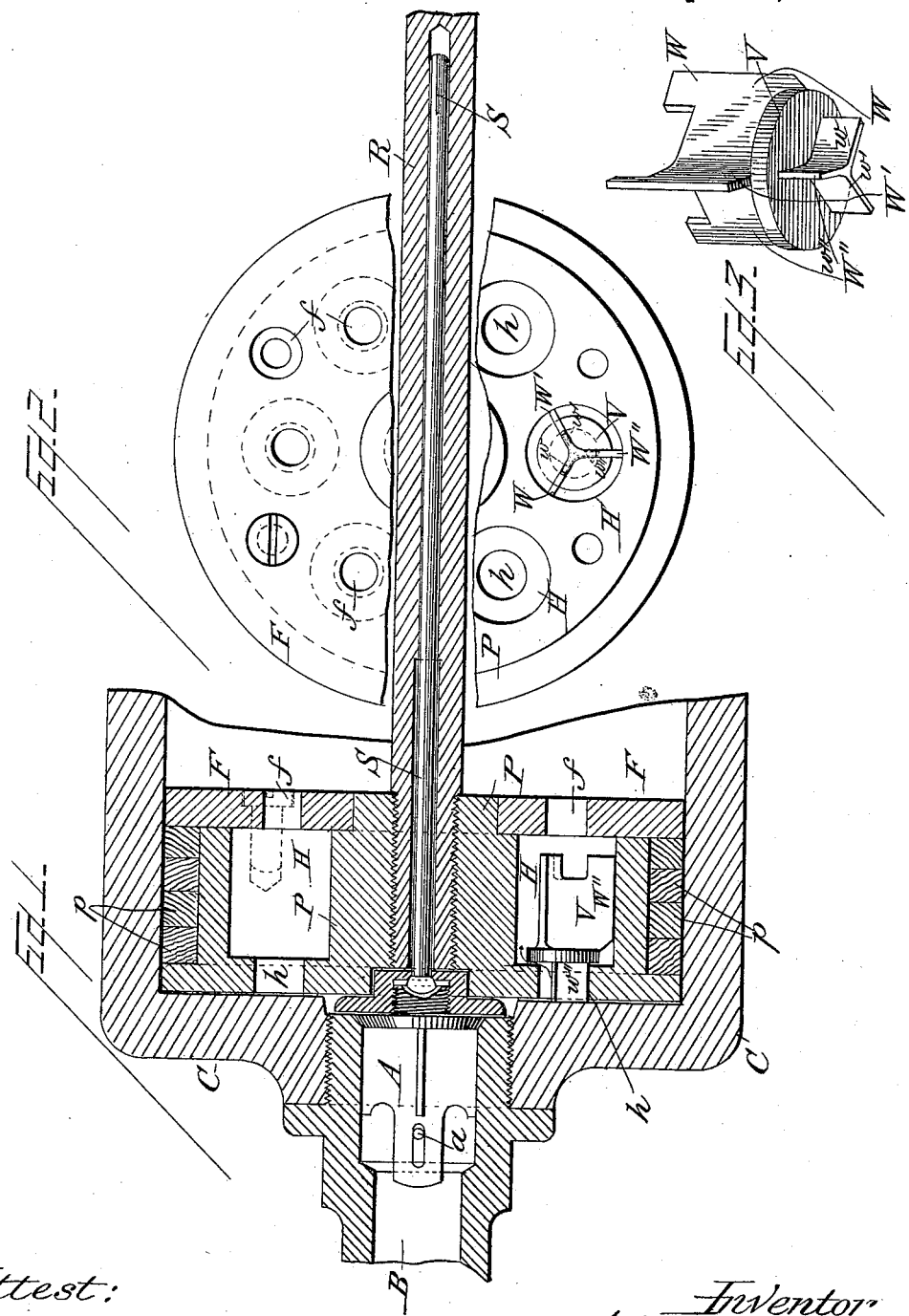

JOHN HERROLD, OF BROOKLYN, NEW YORK, ASSIGNOR, BY DIRECT AND MESNE ASSIGNMENTS, TO NORMAN HUBBARD, OF SAME PLACE, AND JAMES W. PACKARD, OF NEW YORK, N. Y.

VALVE FOR AIR-PUMPS.

SPECIFICATION forming part of Letters Patent No. 450,152, dated April 14, 1891.

Application filed November 27, 1889. Serial No. 331,757. (No model.)

*To all whom it may concern:*

Be it known that I, JOHN HERROLD, a citizen of the United States, residing at Brooklyn, in the county of Kings and State of New York, have invented certain new and useful Improvements in Valves for Air-Pumps; and I do hereby declare the following to be a full, clear, and exact description of the invention, such as will enable others skilled in the art to which it appertains to make and use the same.

My invention consists in the improved valve for mechanical air-pumps, hereinafter to be described and claimed.

In the drawings, Figure 1 is an axial cross-section of the piston, showing the valve seated therein, together with a portion of the pump-cylinder. Fig. 2 is a plan view of the piston with a portion broken away. Fig. 3 is a detail perspective view of the valve.

In that species of air-pump described and illustrated in Patent No. 406,110, granted to James Ward Packard July 2, 1889, there frequently arises a difficulty in the operation of the pump caused by the unseating of one or more valves located upon the piston, whereby the said valve or valves come in between the piston and the end of the cylinder and are crushed or break the pump. To avoid this I have designed another form of valve, hereinafter to be described.

In Fig. 1 of the drawings the piston P is represented as nearly at the bottom of its stroke in the cylinder C. The air from the chamber, which is to be exhausted, is to be admitted through the passage B, which is controlled by the valve A. The valve A is seated in the bottom of the cylinder or in the end of the pipe or passage B and is guided and restricted in its movements by the pin $a$, passing through a slot in one of the wings of the valve. This said valve is lifted positively on the upward stroke of the piston by means of the split rod S, which passes up into the hollow piston-rod R in the manner fully described in patent to Packard above referred to. The piston has the piston-packing rings $p$ and the follower F. In the piston are certain openings H of varying diameters, which pass through said piston, the lower portion of which opening being of less diameter than the upper portion, whereby a collar is formed, preventing the dropping through of any object—such as a valve—which corresponds in diameter to the dimensions of the upper portion of any one of said openings H. The piston-follower has corresponding openings $f$, which register with the openings in the piston, but are of less diameter than the larger portion of said openings. The result of this is to form in the interior of the piston when the follower is in place a chamber of certain diameter, which communicates with the exterior air through openings on either side of less diameter. In these openings are seated the valves V, which have suitable wings W W' W'', which fit the portion of the piston-opening which is of the greatest diameter, and thereby guide the valve as it rises from its seat. A suitable projection from the valve passes through the opening $h$ and touches the end of the cylinder when the piston is at the lower extremity of its motion, thereby positively lifting said valve from its seat. In the preferred form of construction, as shown, this projection is in the form of suitable wings $w\ w'\ w''$, which fit the opening $h$ and still further assist in guiding the movement of the valve V.

The construction and operation of my invention are clear and its advantages obvious. When the exhaustion of the air in the chamber has been carried so far that on the downward stroke of the pump the air trapped in the cylinder has not sufficient expansive power to lift the valve V, said valve is positively lifted by means of the projection touching the bottom of the cylinder, and the air is allowed to escape by it, and is thereby trapped above the piston on the upward stroke of the latter. The air passing by the valve V escapes freely through the openings $f$ in the piston-follower; but there is no possibility of the valve itself, which is of larger diameter than said openings, being forced through said follower or in any way getting upon the top of the piston.

Besides the principal advantage of having the valve within the piston, so that it cannot possibly get between the moving parts if unseated, there is the additional advantage of the neatness and compactness of construction set out and the greater efficiency of the valve due to its accuracy of movement resulting from the efficient way in which it is guided. The exact and complete closure is thereby insured and the possibility of leaking reduced to a minimum.

Having therefore described my invention, what I claim as new, and desire to protect by Letters Patent, is—

1. The combination of a piston which has one or more openings through it, each of which openings is divided into sections of different diameters, a piston-follower having perforations which register with the piston-openings and are of a less diameter than the larger portion of said piston-openings, together with a valve inclosed and seated in said piston-opening, substantially as described.

2. The combination of a piston which has one or more openings through it, each of which openings is divided into sections of different diameters, a piston-follower having perforations which register with the piston-openings and are of a less diameter than the larger portion of said piston-openings, together with a valve inclosed and seated in said piston-opening, and a projection on said valve which extends through the piston-opening and touches the cylinder-head and lifts the valve from its seat when the piston is at the limit of its travel, substantially as described.

3. The combination of a piston-head which has openings therethrough, each of which openings is divided into sections of different diameters, the diameter of the lower section being less than the diameter of the upper section, a follower which partly closes said openings, and valves inclosed and seated in said openings, which valves have upon one side wings which correspond to the wider diameter of opening, while upon the other side they have wings which correspond to the less diameter of opening, whereby the valve is guided in its motion, substantially as described.

In testimony whereof I affix my signature in presence of two witnesses.

JOHN HERROLD.

Witnesses:
J. W. PACKARD,
ED. BEESLEY.